(12) United States Patent
Zhang et al.

(10) Patent No.: US 8,236,721 B2
(45) Date of Patent: Aug. 7, 2012

(54) INORGANIC COMPOSITE BINDERS WITH HIGH-TEMPERATURE RESISTANCE

(75) Inventors: Ze Zhang, Dalian (CN); Lianqi Wei, Beijing (CN); Shufeng Ye, Beijing (CN); Yunfa Chen, Beijing (CN); Peng Liu, Beijing (CN); Yingkun Zou, Dalian (CN); Xinming Zou, Dalian (CN); Jianping Qiu, Dalian (CN)

(73) Assignees: Institute of Process Engineering, Chinese Academy of Sciences, Beijing (CN); Dalian Rino Environment Engineering Science & Technology Co., Ltd., Dalian (CN)

( * ) Notice: Subject to any disclaimer, the term of this patent is extended or adjusted under 35 U.S.C. 154(b) by 1118 days.

(21) Appl. No.: 12/122,366

(22) Filed: May 16, 2008

(65) Prior Publication Data

US 2012/0174828 A1 Jul. 12, 2012

Related U.S. Application Data

(63) Continuation-in-part of application No. PCT/CN2007/000568, filed on Feb. 15, 2007.

(51) Int. Cl.
*C09D 5/00* (2006.01)
*C04B 35/50* (2006.01)
(52) U.S. Cl. .................. 501/152; 106/14.12; 106/18.12; 106/286.1; 106/186.5; 252/601

(58) Field of Classification Search .................. 501/152; 106/14.12, 18.12, 286.1, 286.5; 252/601
See application file for complete search history.

(56) References Cited

U.S. PATENT DOCUMENTS 7,494,692 B2 * 2/2009 Ye et al. ..................... 427/372.2

* cited by examiner

*Primary Examiner* — Karl Group
(74) *Attorney, Agent, or Firm* — Hanley, Flight & Zimmerman, LLC

(57) ABSTRACT

In certain examples, this invention provides an inorganic composite binder with high-temperature resistance comprising 5-12% of aluminum hydroxide, 15-35% of phosphoric acid, 0.1-1% of rare earth oxide, 5-20% of silica sol, 1-15% of polyaluminum phosphate, 1-5% of borax, based on the total weight of said binder, and the rest being water, and a method for producing the same. The binder of the example can be used in temporary protective coating layer such as the high temperature coating and the high temperature antioxidation coating layer during the heat treatment of the metal workpiece, can make it possible to form an antioxidation coating layer immediately upon directly spraying the coating onto the substrate surface of the metal at high temperature of 400-1000° C., and can continuously keep its good bonding property under the high temperature environment in the heating furnace, thereby it is helpful to reduce the oxidation loss of the metal material in the heat treatment, and improve the surface quality of the metal material; also, the binder of the invention is usable in patching material for high temperature kiln or refractory material to enhance the material strength and lengthen its service life.

11 Claims, No Drawings

INORGANIC COMPOSITE BINDERS WITH HIGH-TEMPERATURE RESISTANCE

CROSS REFERENCE TO RELATED APPLICATIONS

This patent is a continuation-in-part of International Patent Application PCT/CN2007/000568, filed on Feb. 15, 2007, the entire content of which is hereby expressly incorporated by reference.

TECHNICAL FIELD

This present disclosure pertains to binders and, more particularly, to inorganic composite binders with high-temperature resistance and a method for producing the same.

BACKGROUND ART

When materials are put under the condition of high temperature (e.g. 400-1400° C.) for a long time and is required to have excellent strength and long life, one of simple and feasible methods is to apply a protective coating layer on the surface of the material. For example, a protective coating layer for the various metal substrates to be hot-rolled must be a high-temperature resistant coating layer, and further a binder must be added into the coating layer raw materials to effectively bond the coating layer to the material surface. In addition, it is essential that a high-temperature resistant binder is used in many high-temperature resistant materials such as the patching material for high temperature kilns, the refractory material, or the like.

The high temperature resistant property of the binder is one of important factors which affect the protective effect of the coating layer and the strength of the high-temperature resistant material. Generally, such binders that are commonly used may be divided into an organic binder and an inorganic binder. Among them, the organic binder has a limitation of the heating temperature which is lower than 1,400° C.; on the other hand, the inorganic binder conventionally used includes soluble glass and aluminium dihydrogen phosphate. The sodium or potassium in the soluble glass has a strong corrosive effect on the metal substrate at high temperature, and moreover the soluble glass begins to decompose badly at the temperature of above 900° C., thus gradually losing its bonding function. Additionally, because the commonly used aluminium dihydrogen phosphate or the inorganic binder using the same as its main component has very strong acidity, it may severely react with the coating layer or the other components in the material to produce precipitation and thus lower the bonding function, resulting in, for example, uneven coating on the substrate surface of the material, and furthermore the coating layer is easy to crack at high temperature, especially decomposes strongly at the temperature of up to 1,200° C.

By improving the protective effect of the high-temperature resistant coating layer and the bonding strength of the high-temperature resistant material, it is beneficial to reduce the oxidation loss of the hot-rolled metal workpiece during heat treatment in the heating furnace and enhance the stability of the quality of the metal workpiece surface, as well as to increase the strength of the patching material for high temperature kiln or refractory material and extend its service life. To solve the problem regarding the stability of the binder under high temperature, many current methods include adding some high-temperature resistant auxiliary agents such as special material of silicon carbides, but this would increase the binder cost, thus limiting its application range.

DETAILED DESCRIPTION

Hereinafter, examples of the invention will be described in detail with reference to specific examples. However, it should understand that the examples are provided for illustrating the spirit of the invention rather than limiting the scope of the invention, and other alterations and modifications could be made thereto without departing from the spirit of the invention.

The following examples, provide an inorganic composite binder that can be used at high temperature. The obtained binder can maintain excellent bonding property at the temperature of up to 1,700° C. by selecting the components and determining the blending ratio thereof.

The following examples also provide methods of producing the inorganic composite binder with high-temperature resistance.

In one example, this invention provides a inorganic composite binder with high-temperature resistance comprising 5-12% of aluminium hydroxide, 15-35% of phosphoric acid, 0.1-1% of rare earth oxide, 5-20% of silica sol, 1-15% of polyaluminum phosphate, 1-5% of borax, based on the total weight of said binder, and the rest being water.

When the binder of the examples is added into the high-temperature resistant coatings, then the coating which is at normal temperature can be directly sprayed onto the high temperature (400-1,000° C.) substrate, so as to form good bonding to the substrate surface immediately. The presence of the binder is advantageous in that a high-temperature resistant coating layer can be formed on the substrate surface and then densified, followed by rapidly polymerized to form into network structure in the warming process, and as a result, the high-temperature resistant aggregate can be embedded in the coating layer, resulting in obtaining a dense and uniform film layer; therefore, the binder of the invention is applicable to the protective coating layer at the temperatures under which various metal workpieces are heat-treated. Also, when the binder of the invention is used in the high-temperature resistant material, it can provide good bonding property under high temperature and a desired strength. Because the example binder of the invention is a suspension system at near neutral pH, it has substantially no corrosivity to the substrate, in addition to the strong bonding, and furthermore can bear high temperature of 1,700° C. for a long time.

The rare earth oxides used in the example binders of the invention can be various rare earth oxides by prepared or commercial available, for example, yttric oxide, lanthanic oxide, and lanthanides oxide, among which commonly used are yttrium oxide, lanthanum oxide, cerium oxide, scandium oxide, neodynium oxide, or a mixture of two or more rare earth oxides. The present inventors' studies have revealed that suitable rare earth oxide is advantageous in that the performance of the binder of the invention can be improved, thereby the appropriate amount of the rare earth(usually in the form of oxides) is required to be added into the binder of the invention; while the rare earth oxide in the invention is not particularly restricted, it is may be either a single rare earth oxide or a mixture of two or more rare earth oxides, and the content of the above rare earth oxides is based on the content of total rare earth oxides added in the binder. According to the application requirement of the binder in the practical production, the rare earth oxides to be used may be the oxides by prepared or commercial available, or rare earth ore which is used as it is, as far as it can satisfy the amount of the rare earth oxide required to be added in the binder of the invention. In addition, other components used in the binder of the example invention can be one by self-prepared or industrial products, in which polyaluminum phosphate is generally referred to trimer of aluminium phosphate.

The example binders of the invention is prepared by mixing above components through using water as dispersion medium followed by reacting the mixture at 80-95° C. for 1 to 4 hours by stirring. The binder thus obtained is in a form of a milk white suspension with the density of 1.6-2.2 g/cm3 and the pH of 4.5-6.5.

The binders of the examples is applicable to various coatings which are required to be coated onto the surface of the high-temperature resistant material to form a protective layer, as well as some high-temperature resistant materials such as high temperature coating for hot-rolled metal material and high-temperature antioxidation coating, fire-retarding coating, patching material for high temperature kiln or the like. The addition amount of the binder may be 10-20% of the weight of the high-temperature resistant material, so that the average tensile strength of the high-temperature resistant material is about 15 MPa in 1200° C., that is to say, the material can maintain excellent bonding property when used in high temperature environment for a long time. Specifically:

The example binders can be used in temporary protective coating layer such as the high temperature coating layer and the high temperature antioxidation coating layer during the heat treatment of the metal workpiece, can make it possible to form an antioxidation coating layer immediately upon directly spraying the coating onto the substrate surface of the metal at high temperature of 400-1000° C., and can continuously keep its good bonding property in the heating furnace, thereby it is helpful to reduce the oxidation loss of the metal material in the heat treatment, and improve the surface quality of the metal substrate.

The example binders can be used in the patching material (repairing material) for high temperature kilns. Because the binder has good wettability and bonding property with the components of the patching material such as corundum, quartz, bauxite, refractory clay as well as refractory aggregate such as carbon and carbide, it can be constructed of bulk building material and repairing material, amorphous refractory material such as placing material and joint material with the aggregate. The refractory slurry thus formulated can also be directly sprayed under high temperature, and the patching material has good strength under high temperature, with the result that the average tension strength is about 90 MPa and the rupture strength is about 8 MPa in 1,300° C. Furthermore, the patching material has very good bonding property to the refractory material substrate and equivalent coefficient of thermal expansion to that of the same, and therefore, the service life of the kiln can be extended because of the improved protective effect of the coating layer, and the repairing time and energy can be economized;

The example binders can also be used in various high-temperature resistant materials, for example, using as the binder in the refractory material or fire-retarding material to enhance the strength of the refractory material under high temperature.

Some of the example binders have the following follows technical characteristics:

1. In one example, the binder is an inorganic composite binder with high-temperature resistance prepared by using inorganic material, which can be used in a wide temperature range and can maintain its bonding property under the high temperature of 1,700° C.;

2. The inorganic composite binder with high-temperature resistance provided by the examples described herein can be added into the high-temperature resistant coating instead of the conventionally used binder. When such a coating was applied(for example sprayed) onto the substrate surface at the high temperature of 400-1,000° C. to form a protective coating layer, the binder components can be bonded onto the substrate surface intermediately while volatilizing water from the system so as to accelerate the formation and adhesion of the high-temperature resistant coating layer onto the substrate surface; the high-temperature resistant coating layer thus formed is dense and uniform, and has good thermal shock resistance, thereby such a coating layer is advantageous in that the substrate can be protected at high temperature with a remarkable effect;

3. The inorganic composite binder with high-temperature resistance provided in accordance with the examples described herein can be widely applied to various materials, both applied to a protective coating layer for metal substrate, and to high-temperature refractory material and patching material for high temperature kiln.

In conclusion, the example binders of the invention have good application foreground in metallurgy field and refractory material field.

Example 1

Raw materials and the blending ratio thereof: aluminium hydroxide 5 kg, phosphoric acid 25 kg, cerium oxide 0.1 kg, silica sol 12 kg, polyaluminum phosphate(aluminium tripolyphosphate) 8 kg, borax 3 kg.

The above raw materials were mixed according to the blending ratio thereof and thereto was added water 46.9 Kg, and then the mixture was stirred in the reactor at a constant temperature of approximate 90° C. for about 2 hours to produce a product in a form of a milk white suspension, and finally, the inorganic composite binder with high-temperature resistance can be obtained when the suspension product was loaded in the packing container.

Example 2

Raw materials and the blending ratio thereof: aluminium hydroxide 7 kg, phosphoric acid 32 kg, yttrium oxide 0.2 kg, silica sol 8 kg, polyaluminum phosphate 5 kg, borax 1 kg.

The above raw materials were mixed according to the blending ratio thereof and thereto was added the tap water 46.8 Kg, and then the mixture was stirred in the reactor at a constant temperature of approximate 85° C. for about 3 hours to produce a product in a form of a milk white suspension, and finally, the inorganic composite binder with high-temperature resistance can be obtained when the suspension product was loaded in the packing container.

Example 3

Raw materials and the blending ratio thereof: aluminium hydroxide 5 kg, phosphoric acid 16 kg, lanthanum oxide 0.6 kg, silica sol 15 kg, polyaluminum phosphate 12 kg, borax 4 kg.

The above raw materials were mixed according to the blending ratio thereof and thereto was added the tap water 47.4 Kg, and then the mixture was stirred in the reactor at a constant temperature of approximate 95° C. for about 1 hour to produce a product in a form of a milk white suspension, and finally, the inorganic composite binder with high-temperature resistance can be obtained when the suspension product was loaded in the packing container.

Example 4

Raw materials and the blending ratio thereof: aluminium hydroxide 8 kg, phosphoric acid 30 kg, scandium oxide 0.1 kg, silica sol 6 kg, polyaluminum phosphate 3 kg, borax 2 kg.

The above raw materials were mixed according to the blending ratio thereof and thereto was added the tap water 50.7 Kg, and then the mixture was stirred in the reactor at a constant temperature of approximate 95° C. for about 3 hours to produce a product in a form of a milk white suspension, and finally, the inorganic composite binder with high-temperature resistance can be obtained when the suspension product was loaded in the packing container.

Example 5

Raw materials and the blending ratio thereof: aluminium hydroxide 8 kg, phosphoric acid 30 kg, scandium oxide 0.1 kg, yttrium oxide 0.2 kg, silica sol 5 kg, polyaluminum phosphate 4 kg, borax 1 kg.

The above raw materials were mixed according to the blending ratio thereof and thereto was added the tap water 51.7 Kg, and then the mixture was stirred in the reactor at a constant temperature of approximate 90° C. for about 4 hours to produce a product in a form of a milk white suspension, and finally, the inorganic composite binder with high-temperature resistance can be obtained when the suspension product was loaded in the packing container.

Example 6

Raw materials and the blending ratio thereof: aluminium hydroxide 5 kg, phosphoric acid 25 kg, neodymium oxide 0.2 kg, scandium oxide 0.3 kg, silica sol 7 kg, polyaluminum phosphate 6 kg, borax 1 kg.

The above raw materials were mixed according to the blending ratio thereof and thereto was added the tap water 55.5 Kg, and then the mixture was stirred in the reactor at a constant temperature of approximate 95° C. for about 2 hours to produce a product in a form of a milk white suspension, and finally, the inorganic composite binder with high-temperature resistance can be obtained when the suspension product was loaded in the packing container.

The inorganic composite binder with high-temperature resistance prepared according to the above examples and the method is applicable to various coatings used in high-temperature resistant coating layer for metal protection, patching material for high temperature kiln or other refractory materials. The binder of the invention has good bonding strength and a tensile strength of more than 10 MPa at a temperature of above 1,200° C., and therefore it can maintain excellent bonding property while used at a high temperature of 1,700° C. for a long time.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. An inorganic composite binder with high-temperature resistance, based on the total weight of said binder, it comprising:
    5-12% of aluminium hydroxide,
    15-35% of phosphoric acid,
    0.1-1% of rare earth oxide,
    5-20% of silica sol,
    1-15% of polyaluminum phosphate,
    1-5% of borax, and the rest being water.

2. The binder of claim 1, wherein said rare earth oxide is selected from the group consisting of yttrium oxide, lanthanum oxide, cerium oxide, scandium oxide or neodymium oxide, and a mixture of two or more thereof.

3. The binder of claim 1, wherein said rare earth oxide is derived from rare earth ore.

4. The binder of claim 1, wherein said binder is a suspension obtained by mixing above components with water followed by reacting the mixture at 80-95° C. for 1 to 4 hours by stirring.

5. A high-temperature resistant material comprising the binder as claimed in claim 1, wherein the content of the binder is 10%-20% of the total weight of the high-temperature resistant material.

6. The high-temperature resistant material as claimed in claim 5, wherein said rare earth oxide is selected from the group consisting of yttrium oxide, lanthanum oxide, cerium oxide, scandium oxide or neodymium oxide, and a mixture of two or more thereof.

7. The high-temperature resistant material as claimed in claim 5, wherein said rare earth oxide is derived from rare earth ore.

8. The high-temperature resistant material as claimed in claim 5, including high-temperature resistant coating for metal protection, patching material for high temperature kiln or refractory material.

9. A method of producing an inorganic composite binder with high-temperature resistance, comprising:
    mixing 5-12% of aluminium hydroxide, 15-35% of phosphoric acid, 0.1-1% of rare earth oxide, 5-20% of silica sol, 1-15% of polyaluminum phosphate, 1-5% of borax, based on the total weight of said binder, with water which is the rest of the total, and
    reacting at 80-95° C. for 1 to 4 hours by stirring to obtain a suspension.

10. The method of claim 9, wherein said rare earth oxide selected form the group consisting of yttrium oxide, lanthanum oxide, cerium oxide, scandium oxide or neodymium oxide, and a mixture of two or more thereof.

11. The method of claim 9, wherein said rare earth oxide is derived from rare earth ore.

* * * * *